(12) United States Patent
Muratsu et al.

(10) Patent No.: US 11,469,467 B2
(45) Date of Patent: Oct. 11, 2022

(54) BATTERY MODULE

(71) Applicant: Panasonic Intellectual Property Management Co., Ltd., Osaka (JP)

(72) Inventors: Jiro Muratsu, Osaka (JP); Shinya Geshi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 160 days.

(21) Appl. No.: 16/638,909

(22) PCT Filed: Aug. 27, 2018

(86) PCT No.: PCT/JP2018/031469
§ 371 (c)(1),
(2) Date: Feb. 13, 2020

(87) PCT Pub. No.: WO2019/044724
PCT Pub. Date: Mar. 7, 2019

(65) Prior Publication Data
US 2020/0227699 A1 Jul. 16, 2020

(30) Foreign Application Priority Data

Sep. 4, 2017 (JP) .............................. JP2017-169860

(51) Int. Cl.
*H01M 50/20* (2021.01)
*H01M 50/502* (2021.01)
(Continued)

(52) U.S. Cl.
CPC ......... *H01M 50/20* (2021.01); *H01M 50/502* (2021.01); *H01M 10/658* (2015.04);
(Continued)

(58) Field of Classification Search
CPC .. H01M 50/20; H01M 10/658; H01M 50/572; H01M 2200/103; H01M 50/502; Y02E 60/10
(Continued)

(56) References Cited

U.S. PATENT DOCUMENTS

2014/0255748 A1   9/2014  Jan et al.
2015/0380700 A1  12/2015  Hasegawa et al.
(Continued)

FOREIGN PATENT DOCUMENTS

CN      104995762 A   10/2015
CN      205863251 U    1/2017
(Continued)

OTHER PUBLICATIONS

International Search Report of PCT application No. PCT/JP2018/031469 dated Nov. 13, 2018.
(Continued)

*Primary Examiner* — Jonathan G Jelsma
*Assistant Examiner* — Omar M Kekia
(74) *Attorney, Agent, or Firm* — McDermott Will & Emery LLP (57) ABSTRACT

In a battery module including a plurality of battery blocks, the battery block is configured such that a plurality of assembled batteries each of which is formed of the plurality of batteries are arranged in parallel. The battery has a positive-electrode terminal and a negative electrode terminal on one end portion of the battery. The assembled battery includes a positive electrode bus bar for connecting the plurality of batteries in parallel and a negative electrode bus bar for connecting the plurality of batteries in parallel, which are disposed on one end portions of the batteries. On a boundary portion between the battery blocks, the positive electrode bus bars of the respective assembled batteries of
(Continued)

one battery block and the negative electrode bus bars of the respective assembled batteries of the other battery block are respectively connected to each other in series by an inter-block connecting bus bar.

11 Claims, 9 Drawing Sheets

(51) Int. Cl.
*H01M 10/658* (2014.01)
*H01M 50/572* (2021.01)
(52) U.S. Cl.
CPC .... *H01M 50/572* (2021.01); *H01M 2200/103* (2013.01); *Y02E 60/10* (2013.01)
(58) Field of Classification Search
USPC .......................................................... 429/99
See application file for complete search history.

(56) References Cited

U.S. PATENT DOCUMENTS

2016/0036102 A1\* 2/2016 Suzuki .............. H01M 10/6556
429/120
2017/0018750 A1 1/2017 Wintner

FOREIGN PATENT DOCUMENTS

JP 2016-516273 6/2016
WO 2014/125806 8/2014

OTHER PUBLICATIONS

English Translation of Chinese Office Action dated Jan. 28, 2022 for the related Chinese Patent Application No. 201880052231.3.

\* cited by examiner

BATTERY MODULE

TECHNICAL FIELD

The present invention relates to a battery module where a plurality of battery blocks each of which is formed by connecting a plurality of batteries to each other in parallel are arranged.

BACKGROUND ART

There has been known a battery module where a battery block is formed by connecting a plurality of batteries to each other in parallel, and a plurality of the battery blocks are connected to each other in series thus enabling the battery module to output a predetermined voltage and a predetermined capacity.

PTL 1 describes a battery block where a positive-electrode terminal and a negative-electrode terminal are mounted on one end portion of a battery, positive-electrode terminals and negative-electrode terminals of a plurality of batteries are connected in parallel to positive electrode bus bars and negative electrode bus bars arranged on one end portions of the batteries. In this configuration, the positive electrode bus bar and the negative electrode bus bar are stacked on each other with an insulation plate interposed therebetween, holes are respectively formed in the bus bars and the insulation plate, and the positive-electrode terminal or the negative-electrode terminal of the battery is connected to the upper-layer bus bar via wires which pass through the holes.

CITATION LIST

Patent Literature

PTL 1: Unexamined Japanese Patent Publication No. 2016-516273

SUMMARY OF THE INVENTION

However, in the battery block described in PTL 1, the positive electrode bus bars and the negative electrode bus bars are stacked on each other with the insulation plate interposed therebetween and hence, it is necessary to form the holes in the bus bars and the insulation plate respectively for allowing wires to pass through the holes corresponding to positions of the batteries. Accordingly, when an arrangement of the batteries is changed in the battery block, it is necessary to form holes corresponding to the change of the arrangement. Accordingly, there is a drawback that, to make the battery block compatible with various battery arrangements, a manufacturing cost is increased.

Further, in a case where a battery block is formed by arranging a plurality of batteries in an array, positive electrode bus bars and negative electrode bus bars stacked on each other with an insulation plate interposed therebetween are respectively formed of a flat plate which covers all batteries. Accordingly, the area is increased thus giving rise to a drawback that a material cost is increased.

The present invention has been made in view of the above-mentioned drawbacks, and it is a main object of the present invention to provide a battery module where a plurality of battery blocks each of which is formed by connecting a plurality of batteries to each other in parallel are arranged, wherein the battery module can reduce a manufacturing cost and a material cost.

The battery module according to the present invention includes a plurality of battery blocks that are each formed by connecting a plurality of batteries to each other in parallel, the plurality of battery blocks being arranged. Each of the plurality of battery blocks is configured, such that a plurality of assembled batteries respectively as a unit being formed of the plurality of batteries, are arranged in parallel. Each of the plurality of the batteries has a positive-electrode terminal and a negative-electrode terminal that are electrically insulated from each other on one end portion of the battery.

Each of the plurality of the assembled batteries includes: the plurality of batteries that are arranged in a row in a state where the one end portion of each of the plurality of batteries is directed in the same direction; an insulation holder that is disposed on a side of the one end portion of each of the plurality of batteries and holds the plurality of batteries; and a positive electrode bus bar that is disposed on the one end portion of the plurality of batteries and connects the positive-electrode terminals of the plurality of batteries to each other in parallel, and a negative electrode bus bar that is disposed on the one end portion of each of the plurality of batteries and connects the negative-electrode terminals of the plurality of batteries to each other in parallel.

The plurality of battery blocks are arranged in an arrangement direction of the plurality of batteries that form the plurality of the assembled batteries. On a boundary portion between the plurality of battery blocks disposed adjacently to each other, the positive electrode bus bar of the plurality of assembled batteries of one of the plurality of battery blocks and the negative electrode bus bar of the plurality of assembled batteries of another of the plurality of battery blocks are connected to each other in series by an inter-block connecting bus bar that is disposed in a direction orthogonal to the arrangement direction of the plurality of batteries that form the plurality of the assembled batteries.

According to the present invention, it is possible to provide a battery module where a plurality of battery blocks each of which is formed by connecting a plurality of batteries to each other in parallel are arranged, wherein the battery module can realize the reduction of a manufacturing cost and the reduction of a material cost.

DESCRIPTION OF EMBODIMENT

Hereinafter, exemplary embodiment of the present invention are described in detail with reference to the drawings. The present invention is not limited to the following exemplary embodiment. Further, modifications of the present invention are appropriately conceivable without departing from the scope of the effect of the present invention.

Figure 1:
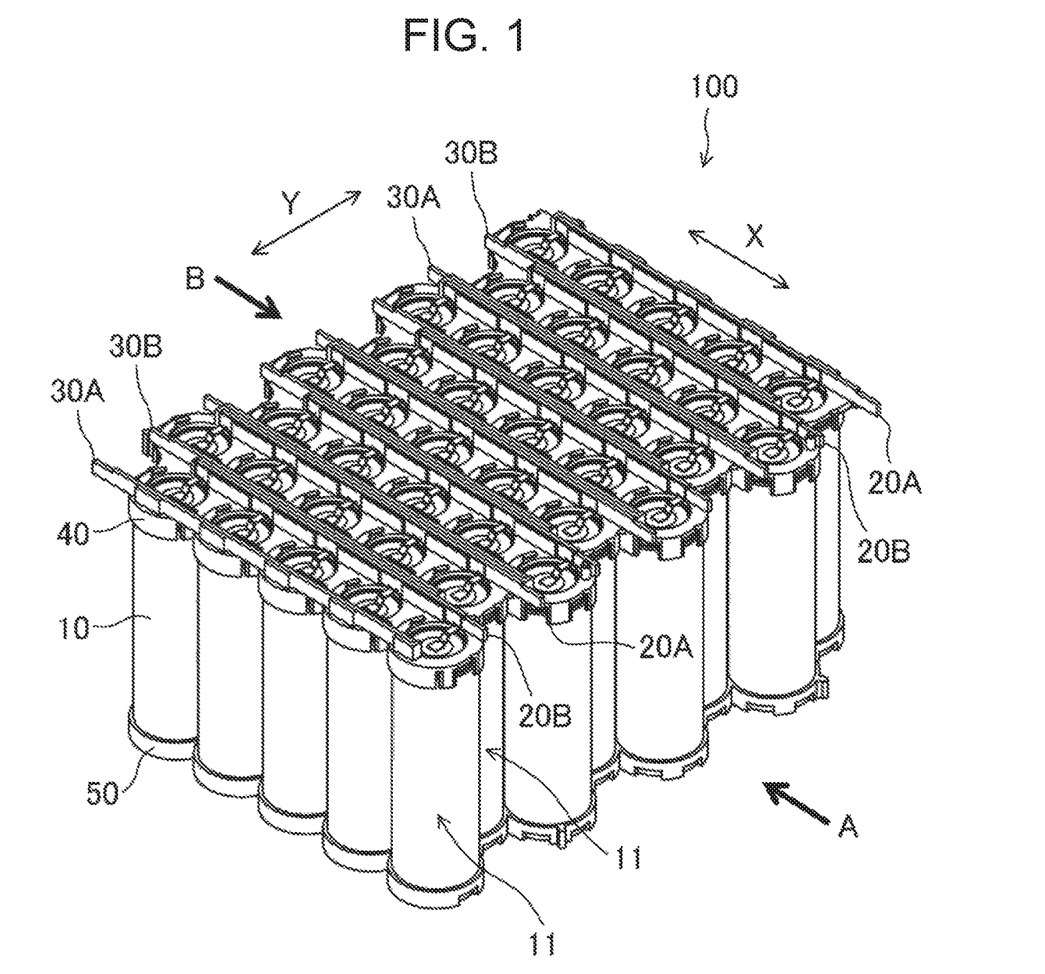
FIG. 1 is a perspective view schematically showing the configuration of a battery block which forms a battery module according to one exemplary embodiment of the present invention.
Figure 2:
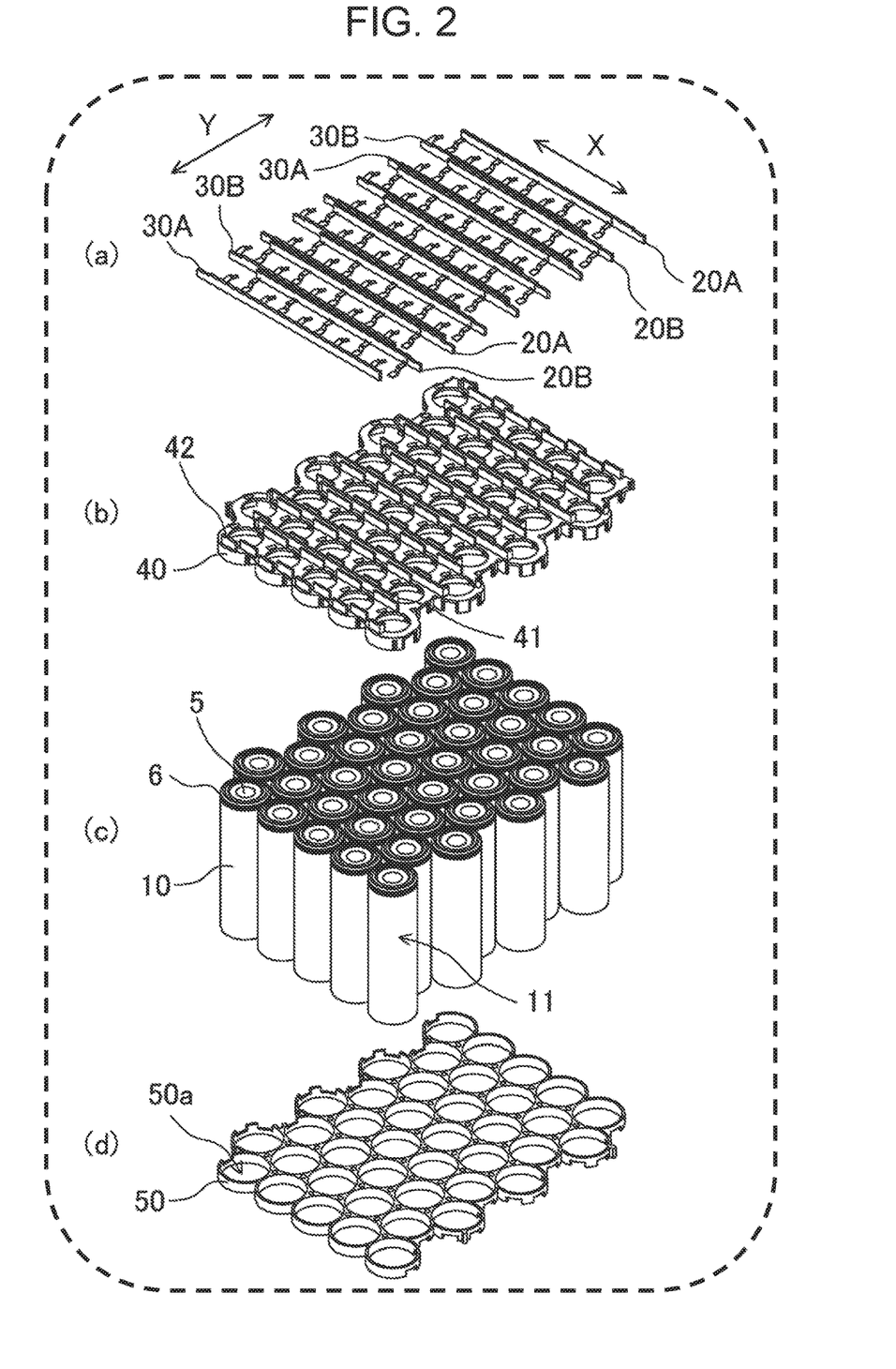
FIG. 2 is exploded views of the battery block according to the present exemplary embodiment.

FIG. 1 is a perspective view schematically showing the configuration of battery block 100 which forms a battery module according to one exemplary embodiment of the present invention, and FIG. 2 is an exploded view of battery block 100.

As shown in FIG. 1 and FIG. 2, battery block 100 according to the present exemplary embodiment is configured such that assembled battery 11 which is formed of a plurality of batteries 10 is set as a unit, and a plurality of assembled batteries 11 are arranged in parallel. The present exemplary embodiment exemplifies the configuration where assembled battery 11 is configured by arranging five batteries 10 in a row in an X direction, and battery block 100 is configured by arranging eight assembled batteries 11 in parallel in a Y direction. However, the present invention is not limited to such a configuration.

As shown in FIG. 2(c), each of batteries 10 which form assembled battery 11 has positive-electrode terminal 5 and negative-electrode terminal 6 which are electrically insulated from each other on one end portion of the battery 10. Assembled battery 11 is configured such that a plurality of batteries 10 are arranged in a row in the X direction such that one end portions of the plurality of batteries 10 are directed in the same direction.

Assembled battery 11 includes insulation holder 40 which is disposed on one end portion side of batteries 10 and holds batteries 10. As shown in FIG. 2(b), in insulation holder 40, holding portions 41, 42 which are formed parallel to each other along a row direction (X direction) are formed. In the present exemplary embodiment, insulation holders 40 each of which is disposed for each assembled battery 11 are formed as an integral body when battery block 100 is viewed as a whole. However, insulation holders 40 may be formed in a separated manner for respective assembled batteries 11.

As shown in FIG. 2(a), assembled battery 11 includes positive electrode bus bar 20B (20A) which connects positive-electrode terminals 5 of the plurality of batteries 10 to each other in parallel, and negative electrode bus bar 30A (30B) which connects negative-electrode terminals 6 of the plurality of batteries 10 to each other in parallel on one end portions of batteries 10. Although the detailed configuration is described later, positive electrode bus bars 20B (20B) and negative electrode bus bars 30A (30B) are respectively held on holding portions 41, 42 formed on insulation holder 40 respectively. With such a configuration, positive electrode bus bar 20B (20A) and negative electrode bus bar 30A (30B) are arranged in parallel to each other along the row direction (X direction) on both sides of batteries 10.

In the present exemplary embodiment, with respect to assembled batteries 11 disposed adjacently to each other, the plurality of batteries 10 which form assembled batteries 11 are disposed in a staggered manner. Accordingly, with respect to assembled batteries 11 disposed adjacently to each other, lengths of positive electrode bus bar 20B and negative electrode bus bar 30A used in one assembled battery 11 and lengths of positive electrode bus bar 20A and negative electrode bus bar 30B used in the other assembled battery 11 are made different from each other.

Cell holder 50 is disposed on an end portion side of batteries 10 on a side opposite to one end portions of batteries 10. Respective batteries 10 are held by cell holder 50 by inserting respective batteries 10 in holes 50a formed in cell holder 50. It is preferable that cell holder 50 be formed as an integral body when battery block 100 is viewed as a whole.

Figure 3:
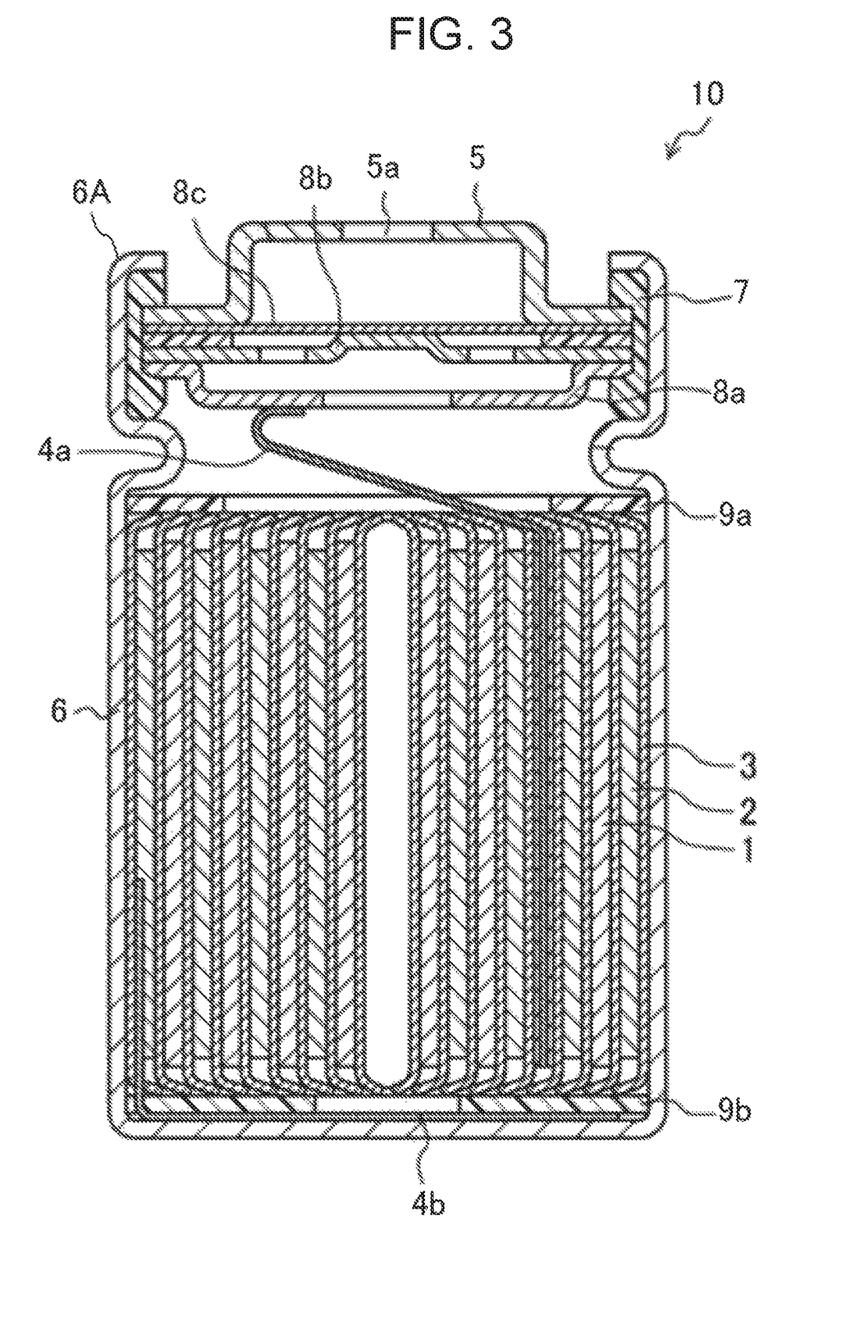
FIG. 3 is a cross-sectional view showing one example of a battery which forms an assembled battery.

As battery 10 which forms assembled battery 11, for example, a lithium ion secondary battery having a circular cylindrical shape as shown in FIG. 3 can be used.

As shown in FIG. 3, battery 10 is formed such that an electrode assembly formed by winding positive electrode 1 and negative electrode 2 with separator 3 interposed between positive electrode 1 and negative electrode 2 is housed in battery case 6 together with a non-aqueous electrolyte (not shown). Insulation plates 9a, 9b are disposed on upper and lower sides of the electrode assembly respectively, positive electrode 1 is bonded to filter 8a by way of positive electrode lead 4a, and negative electrode 2 is bonded to a bottom portion of battery case 6 which also functions as a negative-electrode terminal by way of negative electrode lead 4b.

Filter 8a is connected to inner cap 8b, and a protruding portion of inner cap 8b is bonded to metal-made valve element 8c. Valve element 8c is connected to sealing plate 5 which also functions as the positive-electrode terminal. Sealing plate 5, valve element 8c, inner cap 8b, and filter 8a form an integral body and seal an opening portion of battery case 6 by way of gasket 7. Release portion 5a for discharging a gas generated in battery 10 to the outside is formed in sealing plate 5.

Figures 4A, 4B:
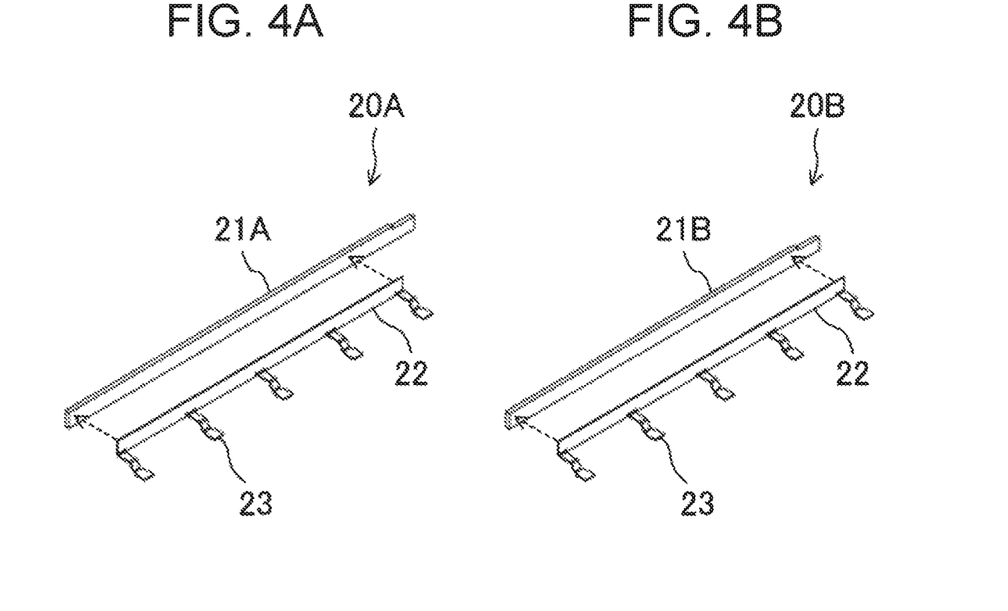
FIG. 4A and FIG. 4B are views schematically showing the configuration of a positive electrode bus bar according to the present exemplary embodiment.

FIG. 4 is a view schematically showing the configuration of the positive electrode bus bar according to the present exemplary embodiment, wherein FIG. 4A shows the configuration of longer positive electrode bus bar 20A, and FIG. 4B shows the configuration of shorter positive electrode bus bar 20B.

Positive electrode bus bar 20A is formed of bus bar main body 21A, and positive-electrode current collecting plate 22 having a plurality of (five in this exemplary embodiment) positive-electrode connecting pieces 23 connected to the positive-electrode terminals of the respective batteries. Bus bar main body 21A and positive-electrode current collecting plate 22 are bonded to each other by ultrasonic welding or the like. In the same manner as positive electrode bus bar 20A, positive electrode bus bar 20B is formed of bus bar main body 21B, and positive-electrode current collecting plate 22 having a plurality of positive-electrode connecting pieces 23 connected to the positive-electrode terminals of the respective batteries. Bus bar main body 21B and positive-electrode current collecting plate 22 are bonded to each other by ultrasonic welding or the like. In such a configuration, bus bar main body 21A is longer than bus bar main body 21B. On the other hand, positive-electrode current collecting plates 22 have the same configuration.

Figure 5A:
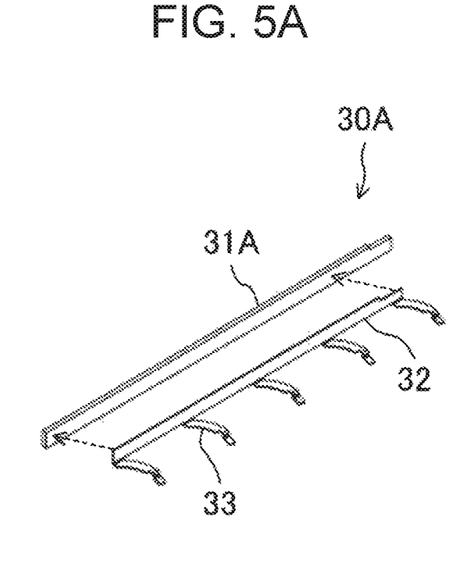
FIG. 5A and FIG. 5B are views schematically showing the configuration of a negative electrode bus bar according to the present exemplary embodiment.
Figure 5B:
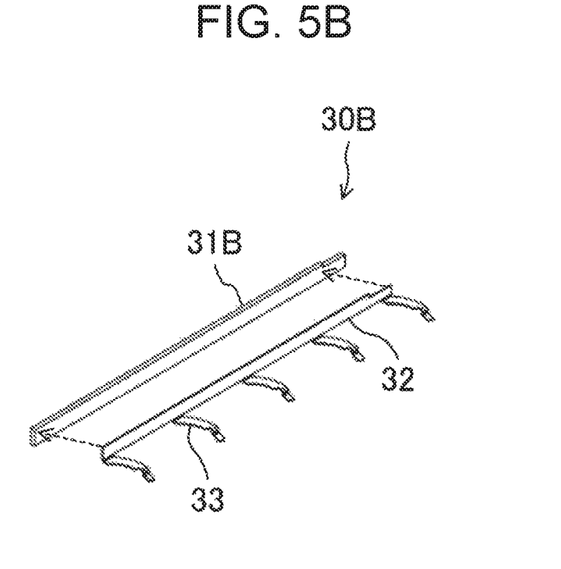

FIG. 5 is a view schematically showing the configuration of the negative electrode bus bar according to the present exemplary embodiment, wherein FIG. 5A shows the configuration of longer negative electrode bus bar 30A, and FIG. 5B shows the configuration of shorter negative electrode bus bar 30B.

In the same manner as the positive electrode bus bars, negative electrode bus bar 30A is formed of bus bar main body 31A, and negative-electrode current collecting plate 32 having a plurality of negative-electrode connecting pieces 33 connected to the negative-electrode terminals of the respective batteries. Bus bar main body 31A and negative-electrode current collecting plate 32 are bonded to each other by ultrasonic welding or the like. In the same manner as negative electrode bus bar 30A, negative electrode bus bar 30B is formed of bus bar main body 31B, and negative-electrode current collecting plate 32 having a plurality of negative-electrode connecting pieces 33 connected to the negative-electrode terminals of the respective batteries. Bus bar main body 31B and negative-electrode current collecting plate 32 are bonded to each other by ultrasonic welding or the like. In such a configuration, bus bar main body 31A is longer than bus bar main body 31B. On the other hand, negative-electrode current collecting plates 32 have the same configuration.

In the present exemplary embodiment, bus bar main bodies (21A, 21B), (31A, 31B) respectively have a thickness and a width corresponding to a current capacity when the plurality of batteries 10 which form assembled battery 11 are connected to each other in parallel. On the other hand, positive-electrode current collecting plate 22 and positive-electrode connecting pieces 23 are formed as an integral body, and negative-electrode current collecting plate 32 and negative-electrode connecting pieces 33 are formed as an integral body. Positive-electrode connecting pieces 23 and negative-electrode connecting pieces 33 have a thickness which allows these pieces 23, 33 to have flexibility so as to be easily connected to positive-electrode terminals 5 and negative-electrode terminals 6 of batteries 10. Although materials for forming bus bar main bodies (21A, 21B), (31A, 31B), positive-electrode current collecting plate 22 (positive-electrode connecting pieces 23), and negative-electrode current collecting plate 32 (negative-electrode connecting pieces 33) are not particularly limited, for example, aluminum or the like can be used.

Figure 6A:
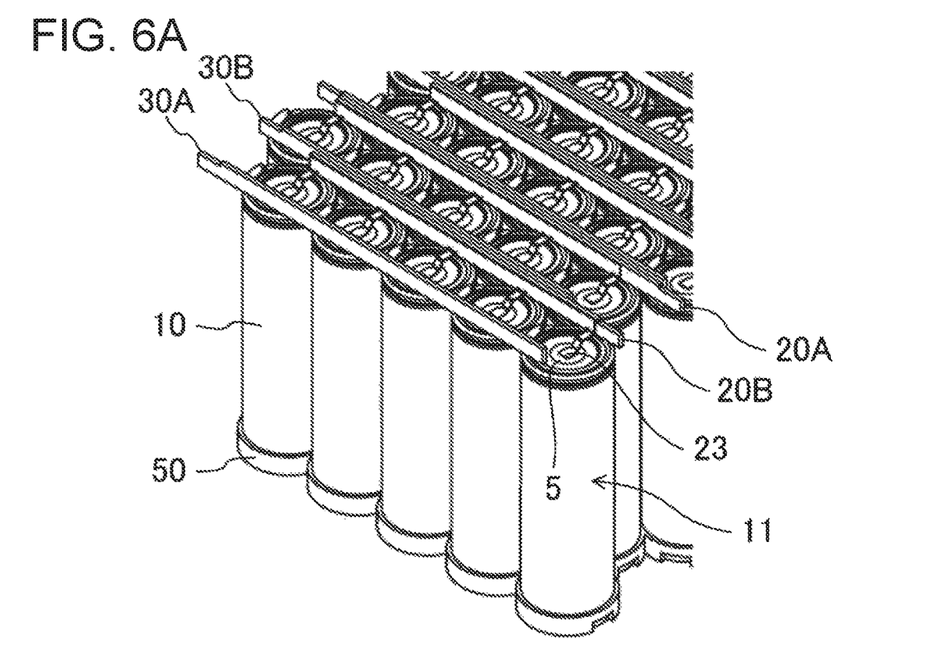
FIG. 6A and FIG. 6B are partially enlarged views showing a state where positive-electrode connecting pieces of the positive electrode bus bar and negative-electrode connecting pieces of the negative electrode bus bar are connected to positive-electrode terminals and negative-electrode terminals of the batteries respectively.
Figure 6B:
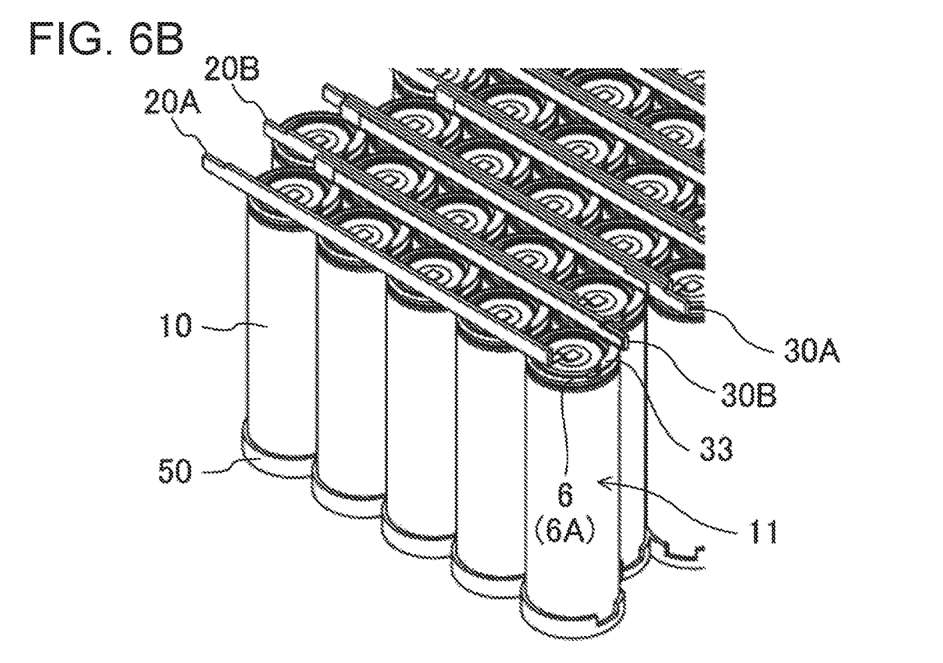

FIG. 6A and FIG. 6B are partially enlarged views showing a state where, in assembled battery 11 disposed at an end of the battery block, positive-electrode connecting pieces 23 of positive electrode bus bar 20B are connected to positive-electrode terminals 5 of batteries 10, and negative-electrode connecting pieces 33 of negative electrode bus bar 30B are connected to negative-electrode terminals 6 of batteries 10. FIG. 6A is a perspective view showing the configuration as viewed in a direction indicated by an arrow A in FIG. 1, and FIG. 6B is a perspective view showing the configuration as viewed in a direction indicated by an arrow B in FIG. 1. In this specification, the illustration of insulation holder 40 is omitted.

As shown in FIG. 6A, positive-electrode connecting pieces 23 of positive electrode bus bar 20B are bonded to positive-electrode terminals 5 of batteries 10 by laser welding or the like, for example. As shown in FIG. 6B, negative-electrode connecting pieces 33 of negative electrode bus bar 30B are bonded to negative-electrode terminals 6 of batteries 10 by laser welding or the like, for example. In this specification, although negative-electrode connecting piece 33 is bonded to shoulder portion 6A of battery case 6 shown in FIG. 3, negative-electrode connecting piece 33 may be bonded to a side wall of battery case 6.

Figure 7:
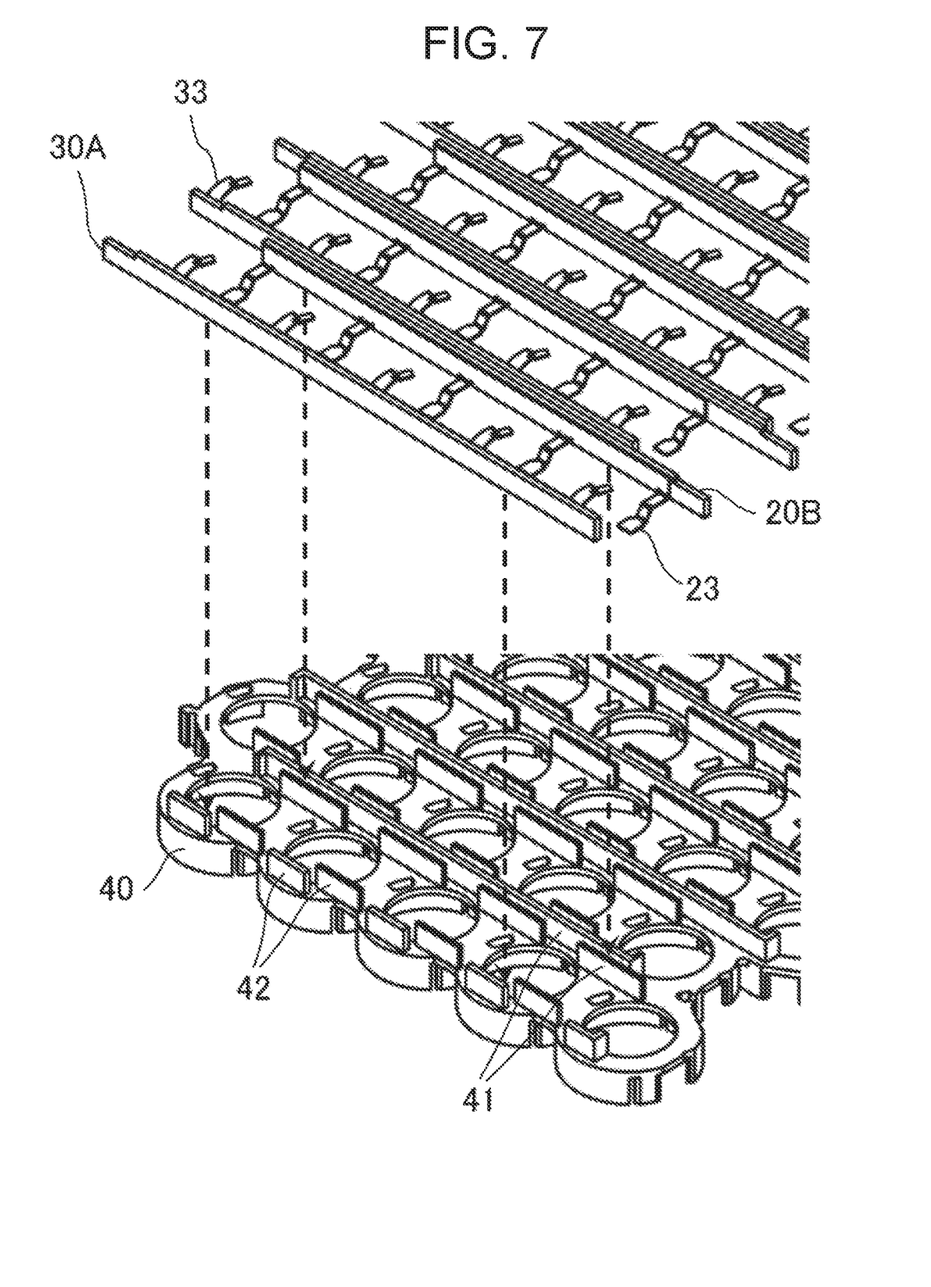
FIG. 7 is a view showing a method of holding the positive electrode bus bars and the negative electrode bus bars on holding portions formed on an insulation holder respectively.

FIG. 7 is a view showing a method of holding positive electrode bus bar 20B and negative electrode bus bar 30A on holding portions 41, 42 formed on insulation holder 40 respectively in assembled battery 11 disposed at an end of the battery block.

As shown in FIG. 7, holding portions 41 which hold positive electrode bus bar 20B, and holding portions 42 which hold negative electrode bus bar 30A are formed parallel to each other along a row direction of batteries 10 which form assembled battery 11. In the present exemplary embodiment, holding portions 41, 42 are each formed of ribs which are arranged in a staggered manner, and positive electrode bus bar 20B and negative electrode bus bar 30A are each held by being inserted into a gap formed between the ribs.

In assembled batteries 11 disposed adjacently to each other, the positive electrode bus bar of one assembled battery 11 and the negative electrode bus bar of the other assembled battery 11 opposedly face each other. However, insulation holding portions 41, 42 are interposed between the positive electrode bus bar and the negative electrode bus bar and hence, there is no possibility that the positive electrode bus bar and the negative electrode bus bar are brought into contact with each other. With such a configuration, it is possible to prevent the occurrence of a phenomenon that assembled batteries 11 disposed adjacently to each other are short-circuited.

In the present exemplary embodiment, although shapes of holding portions 41, 42 are not particularly limited, as described above, to prevent the occurrence of a phenomenon that assembled batteries 11 disposed adjacently to each other are short-circuited with each other, it is preferable that holding portions 41, 42 each have at least a portion positioned outside the positive electrode bus bar or the negative electrode bus bar in a state where holding portions 41, 42 hold the positive electrode bus bar or the negative electrode bus bar.

In the present exemplary embodiment, holding portions 41, 42 are formed of the ribs arranged in a staggered manner. However, for example, holding portions 41, 42 may be formed of ribs extending parallel to each other with a fixed gap therebetween. Insulation holder 40 and holding portions 41, 42 may be integrally formed by separate members.

Figure 8:
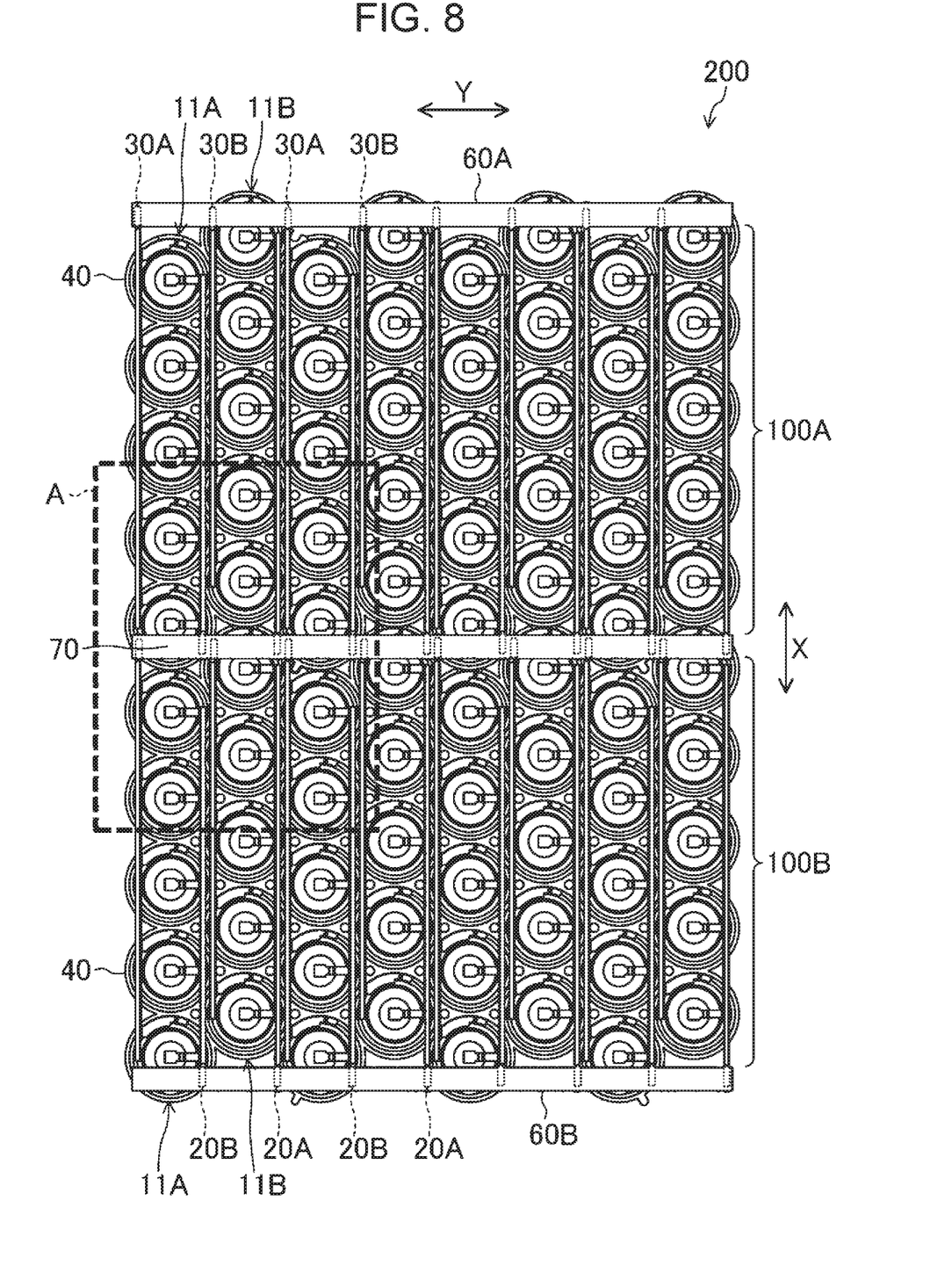
FIG. 8 is a plan view schematically showing the configuration of a battery module according to one exemplary embodiment of the present invention.
Figure 9:
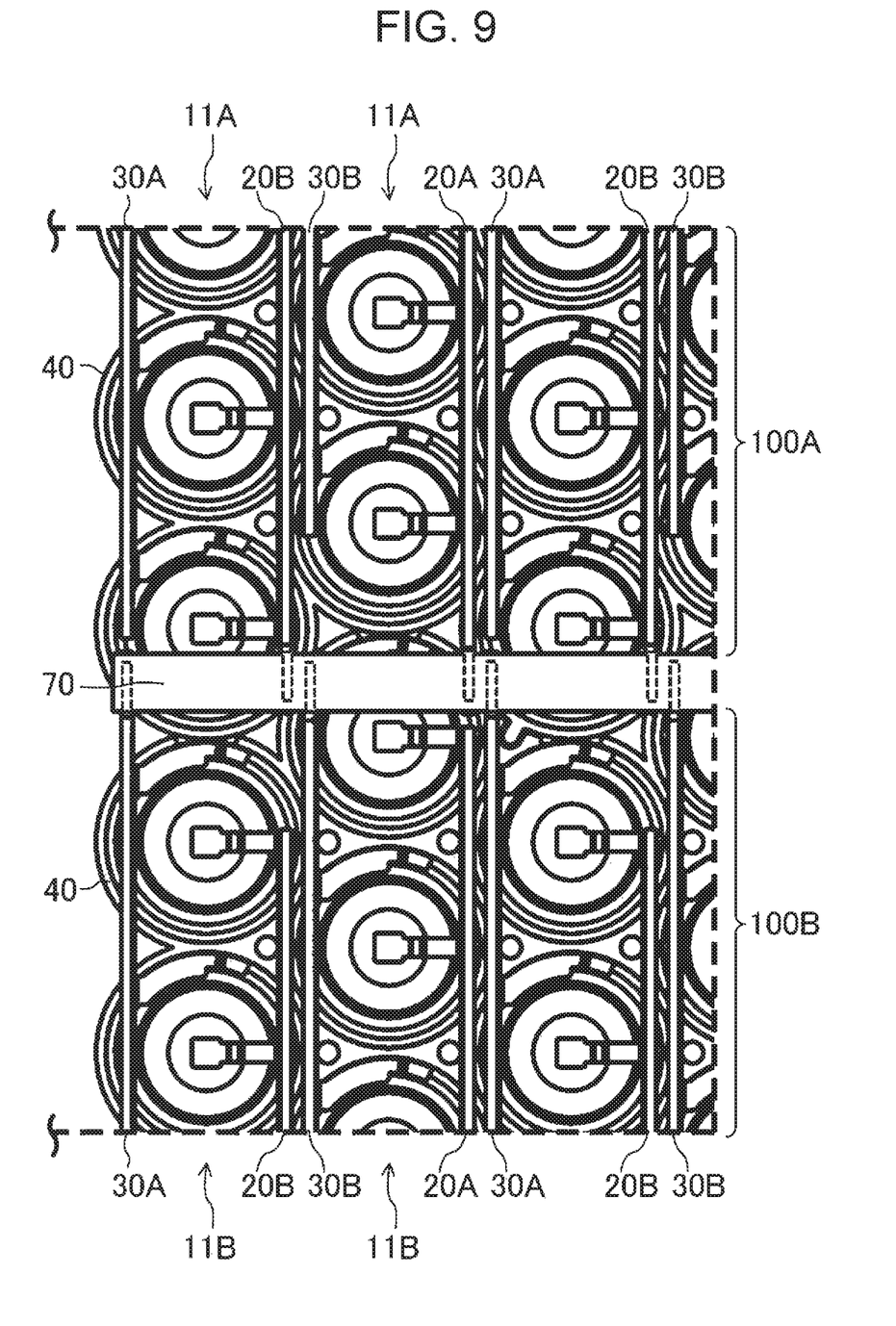
FIG. 9 is a partially enlarged view of the battery module shown in FIG. 8.

FIG. 8 is a plan view schematically showing the configuration of battery module 200 according to one exemplary embodiment of the present invention. FIG. 9 is a partially-enlarged view showing a region A of battery module 200 shown in FIG. 8 in an enlarged manner. In this exemplary embodiment, as the configuration of battery module 200, the configuration is exemplified where two battery blocks 100A, 100B having the configuration shown in FIG. 1 are arranged in an arrangement direction (X direction) of the plurality of batteries which form the assembled battery. However, the number of arranged battery blocks is not limited to two.

As shown in FIG. 8 and FIG. 9, battery module 200 of the present exemplary embodiment is configured such that, on a boundary portion between battery blocks 100A, 100B, positive electrode bus bars 20A, 20B of respective assembled batteries 11A of battery block 100A and negative electrode bus bars 30A, 30B of respective assembled batteries 11B of battery block 100B are respectively connected to each other in series by inter-block connecting bus bar 70 which is disposed in a direction (Y direction) orthogonal to the arrangement direction (X direction) of the plurality of batteries which form the assembled battery.

To be more specific, as shown in FIG. 9, positive electrode bus bars 20A, 20B of respective assembled batteries 11A of battery block 100A extend to inter-block connecting bus bar 70 disposed on the boundary portion between battery block 100A and battery block 100B, and negative electrode bus bars 30A, 30B of respective assembled batteries 11A of battery block 100A do not extend to inter-block connecting bus bar 70.

To be more specific, negative electrode bus bars 30A, 30B of respective assembled batteries 11B of battery block 100B extend to inter-block connecting bus bar 70 disposed on the boundary portion between battery block 100A and battery block 100B, and positive electrode bus bars 20A, 20B of respective assembled batteries 11B of battery block 100B do not extend to inter-block connecting bus bar 70.

With such a configuration, positive electrode bus bars 20A, 20B of respective assembled batteries 11A of battery block 100A and negative electrode bus bars 30A, 30B of respective assembled batteries 11B of battery block 100B can be respectively connected to each other in series by bonding positive electrode bus bars 20A, 20B and negative electrode bus bars 30A, 30B to inter-block connecting bus bar 70 respectively by laser welding, for example.

As shown in FIG. 9, positive electrode bus bars 20A, 20B of respective assembled batteries 11A of battery block 100A and negative electrode bus bars 30A, 30B of respective assembled batteries 11B of battery block 100B are respectively connected to each other in parallel by inter-block connecting bus bar 70.

That is, inter-block connecting bus bar 70 has both a function of connecting positive electrode bus bars 20A, 20B and negative electrode bus bars 30A, 30B of battery blocks 100A, 100B disposed adjacently to each other in series, and a function of connecting positive electrode bus bars 20A, 20B and negative electrode bus bars 30A, 30B of respective battery blocks 100A, 100B to each other in parallel.

As shown in FIG. 8, negative electrode bus bars 30A, 30B of respective assembled batteries 11A of battery block 100A extend to an end portion (an end portion on a side opposite to inter-block connecting bus bar 70) of battery block 100A, and are connected to each other in parallel by in-block connecting bus bar 60A which is disposed on the end portion of battery block 100A. In the same manner, positive electrode bus bars 20A, 20B of respective assembled batteries 11B of battery block 100B extend to an end portion (an end portion on a side opposite to inter-block connecting bus bar 70) of battery block 100B, and are connected to each other in parallel by in-block connecting bus bar 60B which is disposed on the end portion of battery block 100B.

With such a configuration, all batteries 10 which form battery block 100A are connected to each other in parallel by inter-block connecting bus bar 70 and in-block connecting bus bar 60A. In the same manner, all batteries 10 which form battery block 100B are connected to each other in parallel by inter-block connecting bus bar 70 and in-block connecting bus bar 60B.

In this embodiment, provided that inter-block connecting bus bar 70 and in-block connecting bus bars 60A, 60B are electrically conductive members, materials and shapes of these members are not particularly limited. However, it is preferable that these members be formed of a straight and flat-plate-like conductive metal sheet. As such a metal sheet, a plate made of aluminum or the like can be used, for example.

In battery module 200 according to the present exemplary embodiment, assembled battery 11 formed of the plurality of batteries 10 is set as a unit, and battery block 100 is formed by arranging a plurality of assembled batteries 11 in parallel so that all batteries 10 which form battery block 100 are connected to each other in parallel. Accordingly, by arranging a plurality of battery blocks 100 and by connecting battery blocks 100 disposed adjacently to each other in series by inter-block connecting bus bar 70, it is possible to form battery module 200 having a predetermined voltage and a predetermined capacity.

Figure 10:
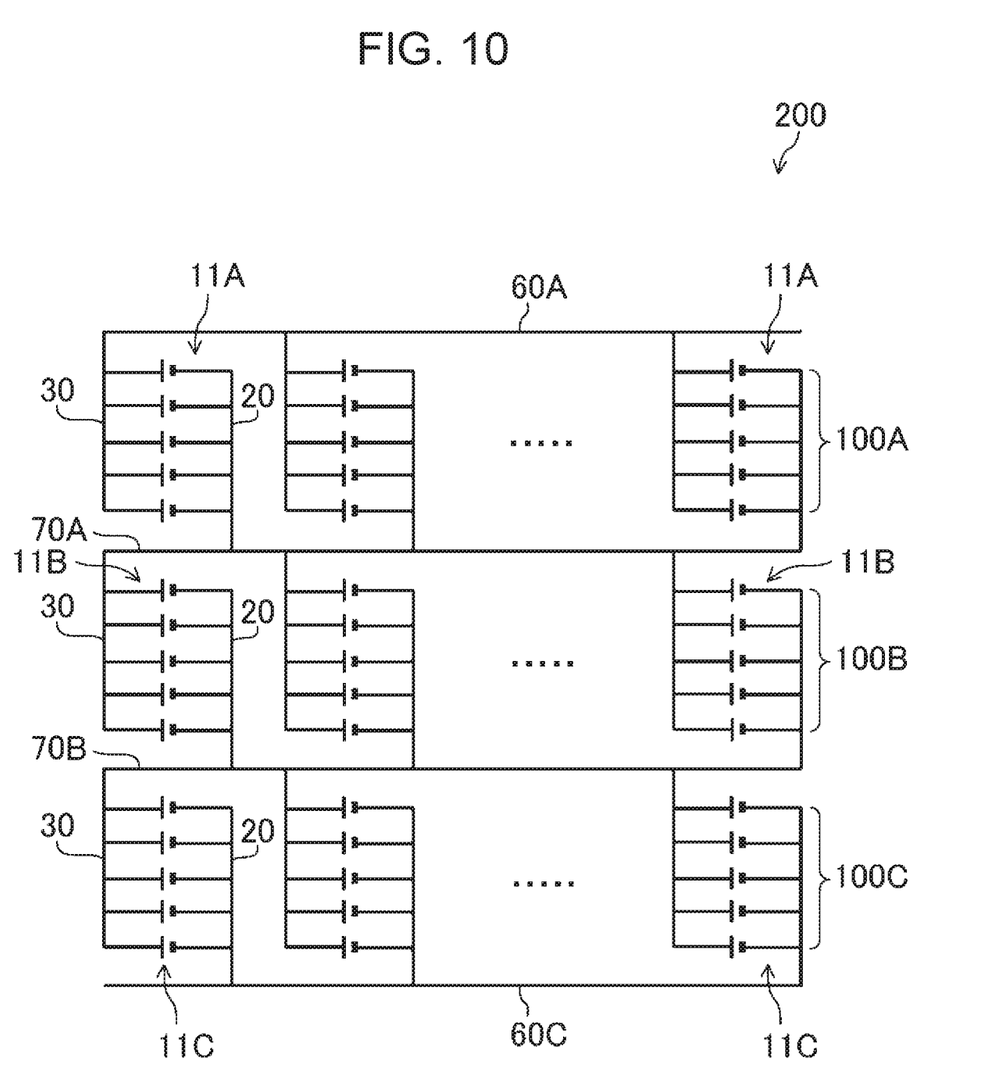
FIG. 10 is a circuit diagram schematically showing the configuration of a battery module where a plurality of battery blocks are connected to each other in series.

FIG. 10 is a circuit diagram schematically showing the configuration of battery module 200 where assembled batteries 11A, 11B, 11C are each formed of a plurality of (five in this exemplary embodiment) batteries, and battery blocks 100A, 100B, 100C in each of which a plurality of assembled batteries 11A, 11B, 11C are respectively arranged in parallel are connected to each other in series.

As shown in FIG. 10, positive electrode bus bars 20 of respective assembled batteries 11A of battery block 100A and negative electrode bus bars 30 of respective assembled batteries 11B of battery block 100B are connected to each other in series by inter-block connecting bus bar 70A disposed on the boundary portion between battery blocks 100A, 100B disposed adjacently to each other, and positive electrode bus bars 20 of respective assembled batteries 11A of battery block 100A and negative electrode bus bars 30 of respective assembled batteries 11B of battery block 100B are connected to each other in parallel.

In the same manner, positive electrode bus bars 20 of respective assembled batteries 11B of battery block 100B and negative electrode bus bars 30 of respective assembled batteries 11C of battery block 100C are connected to each other in series by inter-block connecting bus bar 70B disposed on the boundary portion between battery blocks 100B, 100C disposed adjacently to each other, and positive electrode bus bars 20 of respective assembled batteries 11B of battery block 100B and negative electrode bus bars 30 of respective assembled batteries 11C of battery block 100C are connected to each other in parallel.

Further, in battery blocks 100A, 100C disposed on both ends of the battery module, negative electrode bus bars 30 of respective assembled batteries 11A of battery block 100A and positive electrode bus bars 20 of respective assembled batteries 11C of battery block 100C are respectively connected to each other in parallel by in-block connecting bus bars 60A, 60C disposed on an end portion of battery block 100A and an end portion of battery block 100C respectively.

In this manner, in battery module 200 according to the present exemplary embodiment, the parallel connection of batteries in the battery block and the series connection of the battery blocks can be performed simultaneously by inter-block connecting bus bars 70A, 70B disposed on the boundary portions between the battery modules disposed adjacently to each other. That is, the parallel connection of the batteries in the battery block and the series connection of the battery blocks can be performed by one part (inter-block connecting bus bar). Accordingly, a material cost of the battery module can be reduced and, at the same time, the manufacturing steps can be simplified so that a manufacturing cost can be also reduced.

Further, positive electrode bus bars 20 and negative electrode bus bars 30 extended to inter-block connecting bus bars 70A, 70B disposed on the boundary portions between the battery blocks disposed adjacently to each other are on the same plane (height of positive electrode bus bars 20 and height of negative electrode bus bars 30 being aligned with each other). Accordingly, the laser welding of positive electrode bus bars 20 and negative electrode bus bars 30 with inter-block connecting bus bars 70A, 70B can be easily performed. With such a configuration, a manufacturing cost of battery module 200 can be reduced.

In addition, both the parallel connection of batteries in the battery block and the series connection of the battery blocks can be performed by inter-block connecting bus bars 70A, 70B disposed on the boundary portions between the battery blocks disposed adjacently to each other and hence, a distance between the battery blocks disposed adjacently to each other can be shortened. With such a configuration, it is possible to realize battery module 200 where the plurality of batteries are densely arranged. The battery blocks disposed adjacently to each other can be insulated from each other by insulation holder 40.

According to the present exemplary embodiment, assembled battery 11 formed by connecting the plurality of batteries in parallel is set as a unit, and battery block 100 is formed by arranging the plurality of assembled batteries in parallel. Accordingly, even when an arrangement of assembled batteries which form the battery block is changed, by merely changing a length of the inter-block connecting bus bars and a length of the in-block connecting bus bars, the parallel connection of the batteries in the battery block and the series connection of the battery blocks can be performed. With such a configuration, a manufacturing cost can be reduced also with respect to a battery module by battery blocks having various specifications.

Further, according to the present exemplary embodiment, positive electrode bus bars 20A, 20B and negative electrode bus bars 30A, 30B are provided independently for respective assembled batteries 11. Accordingly, corresponding to the number of batteries 10 which form assembled battery 11, it is possible to design positive electrode bus bars 20A, 20B and negative electrode bus bars 30A, 30B suitable for the current capacity of batteries 10. With such a configuration, a material cost of positive electrode bus bars 20A, 20B and negative electrode bus bars 30A, 30B can be reduced.

Although the present invention has been described heretofore with reference to preferred exemplary embodiment, the above-mentioned descriptions are not limiting items, and it is needless to say that various modifications are conceivable. For example, in the above-mentioned embodiment, in assembled batteries 11 disposed adjacently to each other, the plurality of batteries 10 which form respective assembled batteries 11 are arranged in a staggered manner. However, respective batteries 10 may be aligned in a row in a direction (Y direction) orthogonal to an arrangement direction (X direction) of batteries 10.

In the above-mentioned exemplary embodiment, two kinds of positive electrode bus bars 20A, 20B which differ from each other in length and two kinds of negative electrode bus bars 30A, 30B which differ from each other in length are used. However, positive electrode bus bars of one kind having the same length and negative electrode bus bars of one kind having the same length may be used.

Further, in the above-mentioned embodiment, as batteries 10 which form assembled battery 11, the circular-cylindrical lithium ion secondary battery is exemplified. However, battery 10 is not limited to the circular-cylindrical lithium ion secondary battery, and a kind, a shape and the like of battery 10 are not limited provided that battery 10 has a positive-electrode terminal and a negative-electrode terminal which are electrically insulated from each other on one end portion of battery 10.

The invention claimed is:

1. A battery module comprising a plurality of battery blocks that are each formed by connecting a plurality of batteries to each other in parallel, the plurality of battery blocks being arranged, wherein:
    each of the plurality of battery blocks is configured such that a plurality of assembled batteries, respectively as a unit being formed of the plurality of batteries, are arranged in parallel,
    each of the plurality of the batteries has a positive-electrode terminal and a negative-electrode terminal that are electrically insulated from each other on one end portion of the battery,
    each of the plurality of the assembled batteries includes:
        the plurality of batteries that are arranged in a row in a state where the one end portion of each of the plurality of batteries is directed in the same direction;
        an insulation holder that is disposed on a side of the one end portion of each of the plurality of batteries and holds the plurality of batteries; and
        a positive electrode bus bar that is disposed on the one end portion of the plurality of batteries and connects the positive-electrode terminals of the plurality of batteries to each other in parallel, and a negative electrode bus bar that is disposed on the one end portion of each of the plurality of batteries and connects the negative-electrode terminals of the plurality of batteries to each other in parallel,
    the insulation holder includes holding ribs which are arranged in a staggered manner so that the positive electrode bus bar and the negative electrode bus bar are each held by being inserted into a gap formed between the holding ribs,
    the plurality of battery blocks are arranged in an arrangement direction of the plurality of batteries that form the plurality of the assembled batteries, and
    on a boundary portion between the plurality of battery blocks disposed adjacently to each other, the positive electrode bus bar of the plurality of assembled batteries of one of the plurality of battery blocks and the negative electrode bus bar of the plurality of assembled batteries of another of the plurality of battery blocks are connected to each other in series by an inter-block connecting bus bar that is disposed in a direction orthogonal to the arrangement direction of the plurality of batteries that form the plurality of the assembled batteries.

2. The battery module according to claim 1, wherein on the boundary portion between the battery blocks disposed adjacently to each other, the positive electrode bus bars of the plurality of the assembled batteries of the one of the plurality of battery blocks and the negative electrode bus bars of the plurality of the assembled batteries of the another of the plurality of battery blocks are respectively connected to each other in parallel by the inter-block connecting bus bar.

3. The battery module according to claim 1, wherein in the battery blocks disposed adjacently to each other, the positive electrode bus bars of the plurality of the assembled batteries of the one of the plurality of battery blocks and the negative electrode bus bars of the plurality of the assembled batteries of the another of the plurality of battery blocks are respectively extended to the inter-block connecting bus bar disposed on the boundary portion between the battery blocks disposed adjacently to each other.

4. The battery module according to claim 1, wherein in the battery blocks disposed on both ends of the battery module out of the plurality of battery blocks, the positive electrode bus bars of the plurality of the assembled batteries of the one of the plurality of battery blocks and the negative electrode bus bars of the plurality of the assembled batteries of the another of the plurality of battery blocks are respectively connected to each other in parallel by an in-block connecting bus bar that is disposed in a direction orthogonal to the arrangement direction of the plurality of batteries that form the assembled battery.

5. The battery module according to claim 1, wherein the positive electrode bus bar and the negative electrode bus bar of each of the plurality of the assembled battery batteries are held on holding portions that are formed parallel to each other on the insulation holder along a row direction.

6. The battery module according to claim 1, wherein the positive electrode bus bar has a plurality of positive-electrode connecting pieces each connected to the positive-electrode terminal of each of the plurality of batteries, and
the negative electrode bus bar has a plurality of negative electrode connecting pieces each connected to the negative-electrode terminal of each of the plurality of the batteries.

7. The battery module according to claim 1, wherein
each of the plurality of batteries includes a battery case made of metal, and a sealing plate which seals an opening portion of the battery case and is electrically insulated from the battery case,
the positive-electrode terminal is formed of the sealing plate, and
the negative-electrode terminal is formed of the battery case.

8. The battery module according to claim 1, wherein:
each of the positive electrode bus bar and the negative electrode bus bar has a bar shape having a width smaller than a height, and
the inter-block bus bar has a bar shape having a width greater than the width of each of the positive electrode bus bar and the negative electrode bus bar.

9. The battery module according to claim 1, wherein the positive electrode bus bar and the negative electrode bus bar are welded to the inter-block bus bar.

10. A battery module comprising a plurality of battery blocks that are each formed by connecting a plurality of batteries to each other in parallel, the plurality of battery blocks being arranged, wherein:
each of the plurality of battery blocks is configured such that a plurality of assembled batteries, respectively as a unit being formed of the plurality of batteries, are arranged in parallel,
each of the plurality of the batteries has a positive-electrode terminal and a negative-electrode terminal that are electrically insulated from each other on one end portion of the battery,
each of the plurality of the assembled batteries includes:
the plurality of batteries that are arranged in a plurality of rows in a state where the one end portion of each of the plurality of batteries is directed in the same direction;
an insulation holder that is disposed on a side of the one end portion of each of the plurality of batteries and holds the plurality of batteries;
a plurality of positive electrode bus bars that are disposed on the one end portion of the plurality of batteries and connect the positive-electrode terminals of the plurality of batteries to each other in parallel; and
a plurality of negative electrode bus bars that are disposed on the one end portion of each of the plurality of batteries and connect the negative-electrode terminals of the plurality of batteries to each other in parallel,
the plurality of battery blocks are arranged in an arrangement direction of the plurality of rows of the plurality of batteries that form the plurality of the assembled batteries, and
on a boundary portion between the plurality of battery blocks disposed adjacently to each other, each of the plurality of the positive electrode bus bars of the plurality of assembled batteries of one of the plurality of battery blocks and each of the plurality of the negative electrode bus bars of the plurality of assembled batteries of another of the plurality of battery blocks are connected to each other in series by an inter-block connecting bus bar that is disposed in a direction orthogonal to the arrangement direction of the plurality of batteries that form the plurality of the assembled batteries, and
each of the plurality of the positive electrode bus bars of the plurality of assembled batteries of one of the plurality of battery blocks and each of the plurality of the negative electrode bus bars of the plurality of assembled batteries of another of the plurality of battery blocks extend to the inter-block connecting bus bar such that the positive electrode bus bar of the plurality of assembled batteries of one of the plurality of battery blocks and the negative electrode bus bar of the plurality of assembled batteries of another of the plurality of battery blocks are overlapped with the inter-block connecting bus bar when viewed from a direction perpendicular to the arrangement direction of the plurality of batteries.

11. A battery module comprising a plurality of battery blocks that are each formed by connecting a plurality of batteries to each other in parallel, the plurality of battery blocks being arranged, wherein:
each of the plurality of battery blocks is configured such that a plurality of assembled batteries, respectively as a unit being formed of the plurality of batteries, are arranged in parallel,
each of the plurality of the batteries has a positive-electrode terminal and a negative-electrode terminal that are electrically insulated from each other on one end portion of the battery,
each of the plurality of the assembled batteries includes:
the plurality of batteries that are arranged in a row in a state where the one end portion of each of the plurality of batteries is directed in the same direction;
an insulation holder that is disposed on a side of the one end portion of each of the plurality of batteries and holds the plurality of batteries;
a positive electrode bus bar that is disposed on the one end portion of the plurality of batteries and connects the positive-electrode terminals of the plurality of batteries to each other in parallel; and
a negative electrode bus bar that is disposed on the one end portion of each of the plurality of batteries and connects the negative-electrode terminals of the plurality of batteries to each other in parallel,
the plurality of battery blocks are arranged in an arrangement direction of the plurality of batteries that form the plurality of the assembled batteries,
on a boundary portion between the plurality of battery blocks disposed adjacently to each other, the positive electrode bus bar of the plurality of assembled batteries of one of the plurality of battery blocks and the negative electrode bus bar of the plurality of assembled batteries of another of the plurality of battery blocks are connected to each other in series by an inter-block connecting bus bar that is disposed in a direction orthogonal to the arrangement direction of the plurality of batteries that form the plurality of the assembled batteries, the positive electrode bus bar has a plurality of positive-electrode connecting pieces each connected to the positive-electrode terminal of each of the plurality of batteries and s, a positive-electrode current collecting plate which connects to one end of each of the plurality of positive-electrode connecting pieces and a positive-electrode main body which is stacked with the positive-electrode current collecting plate and extend from the positive-electrode current collecting plate in the arrangement direction of the plurality of batteries, and the negative electrode bus bar has a plurality of negative electrode connecting pieces each connected to the negative-electrode terminal of each of the plurality of the batteries, a negative-electrode current collecting plate which connects to one end of each of the plurality of negative-electrode connecting pieces and a negative-electrode main body which is stacked with the negative-electrode current collecting plate and extend from the negative-electrode current collecting plate in the arrangement direction of the plurality of batteries.

* * * * *